United States Patent Office 3,421,266
Patented Jan. 14, 1969

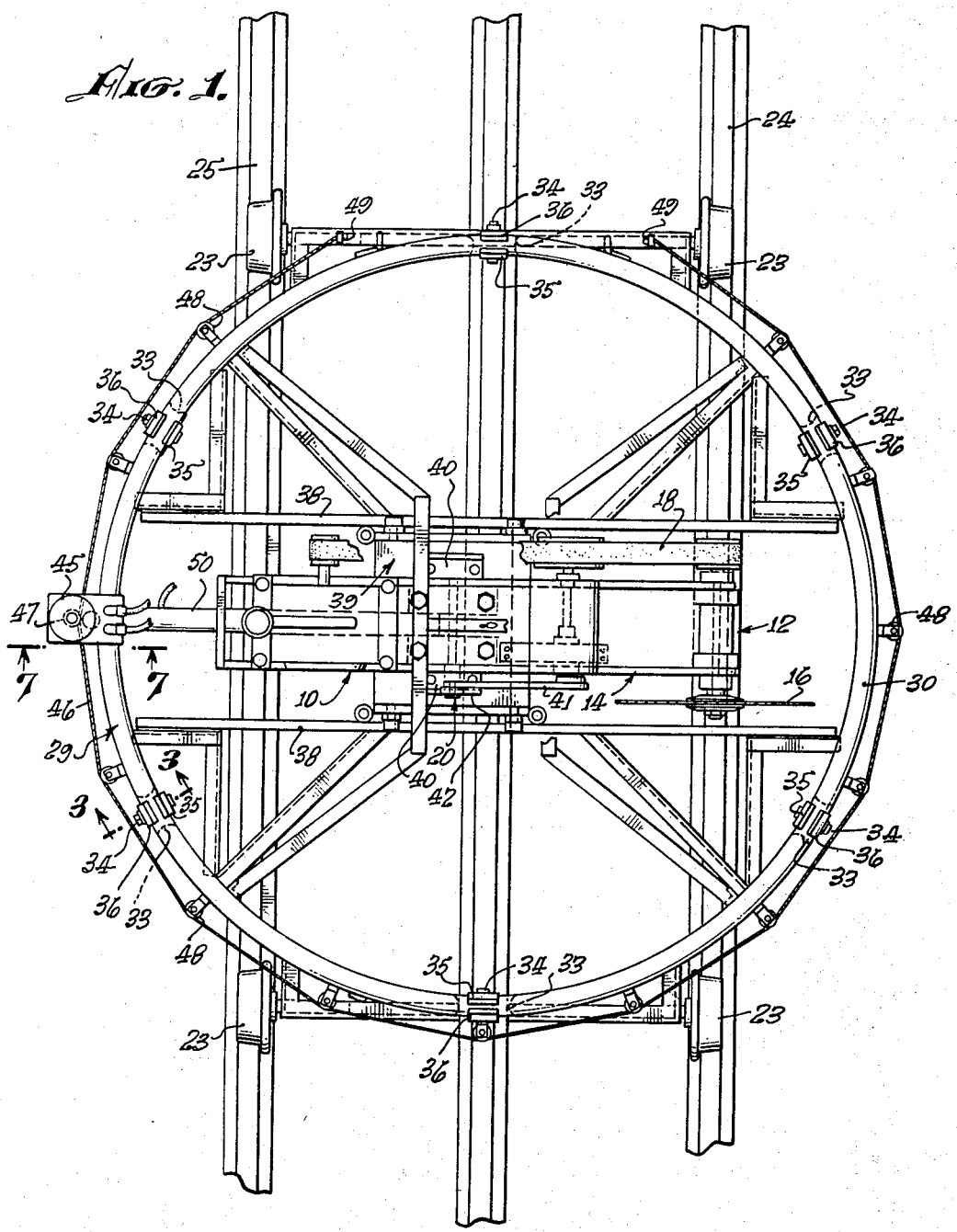

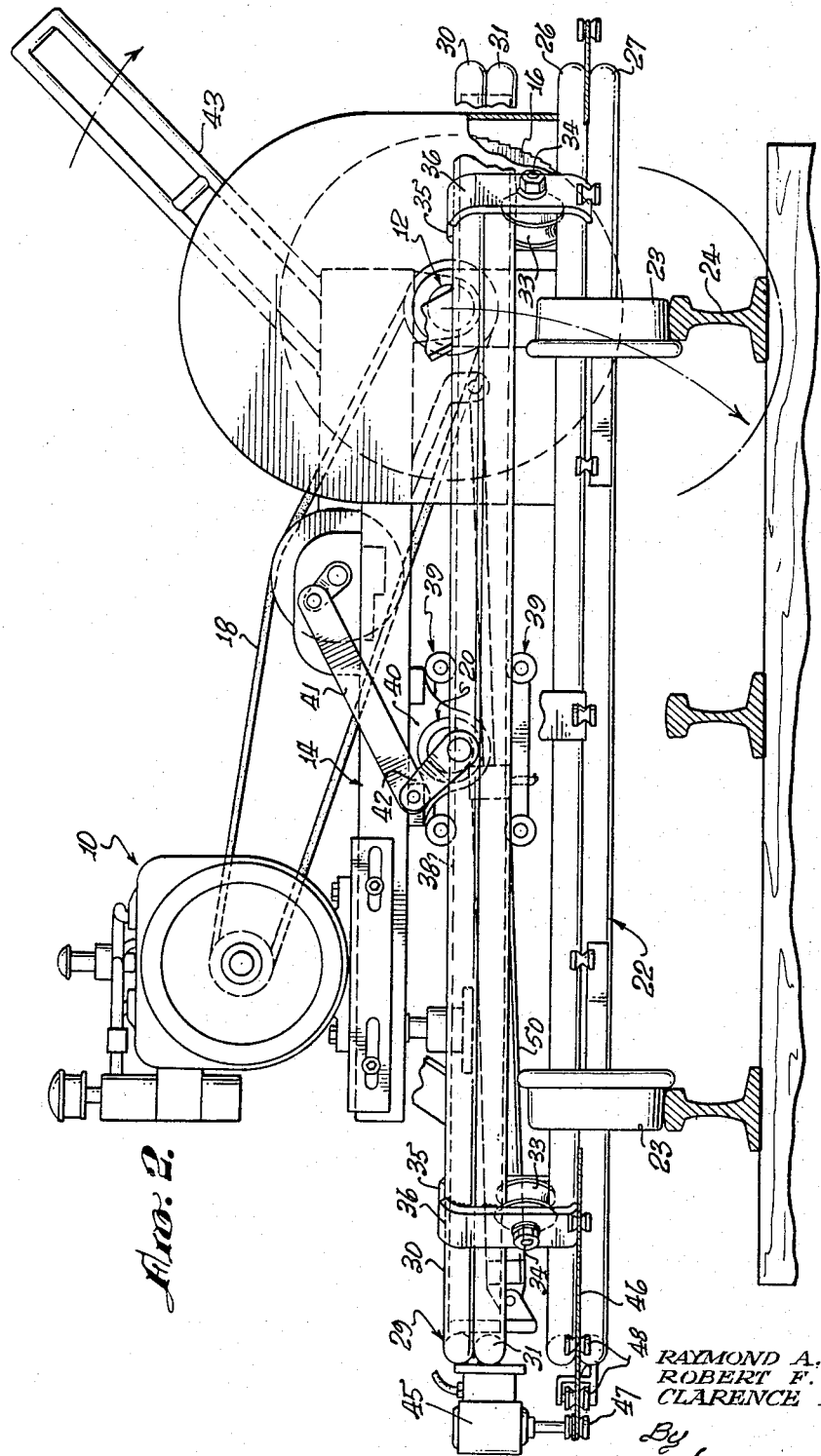

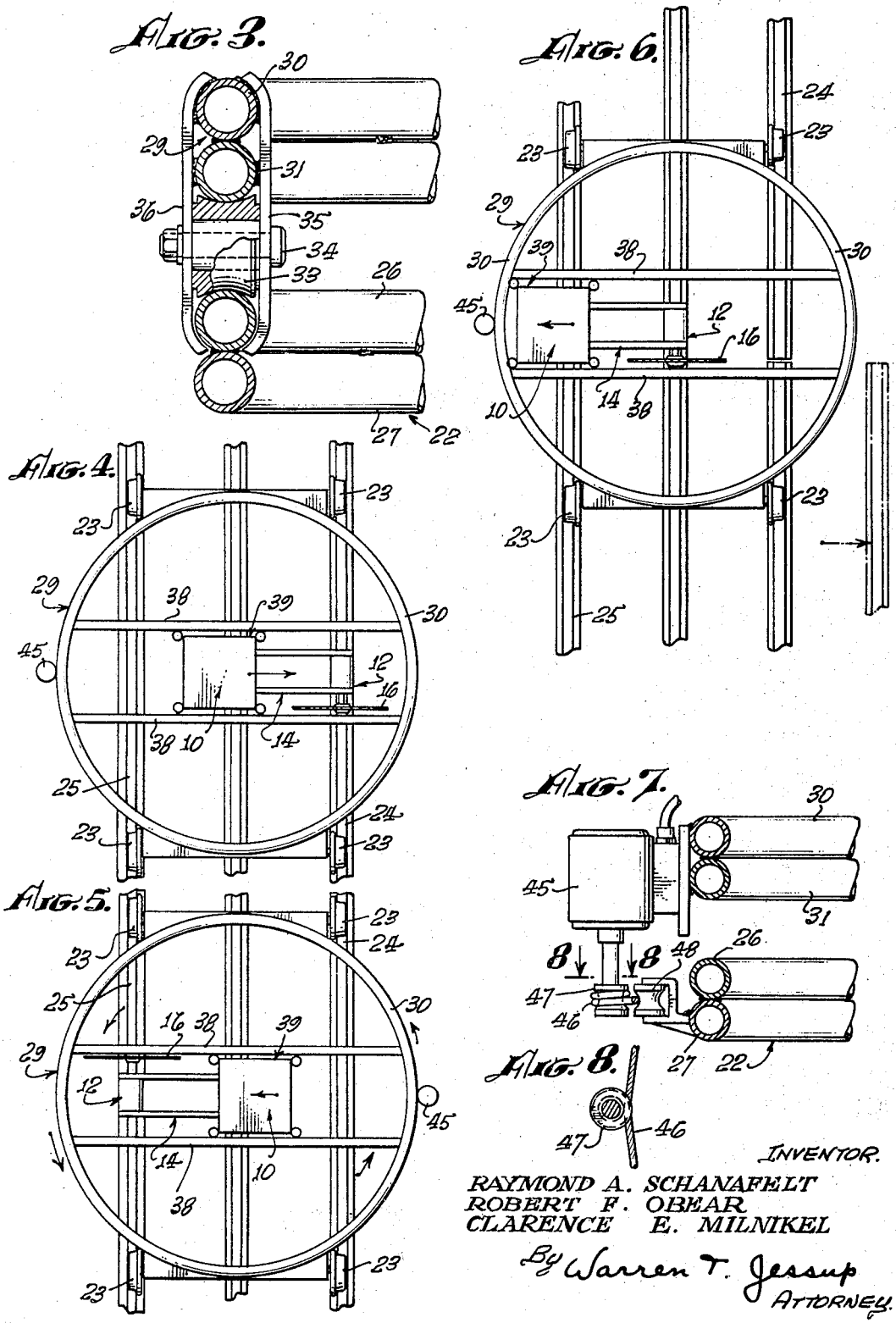

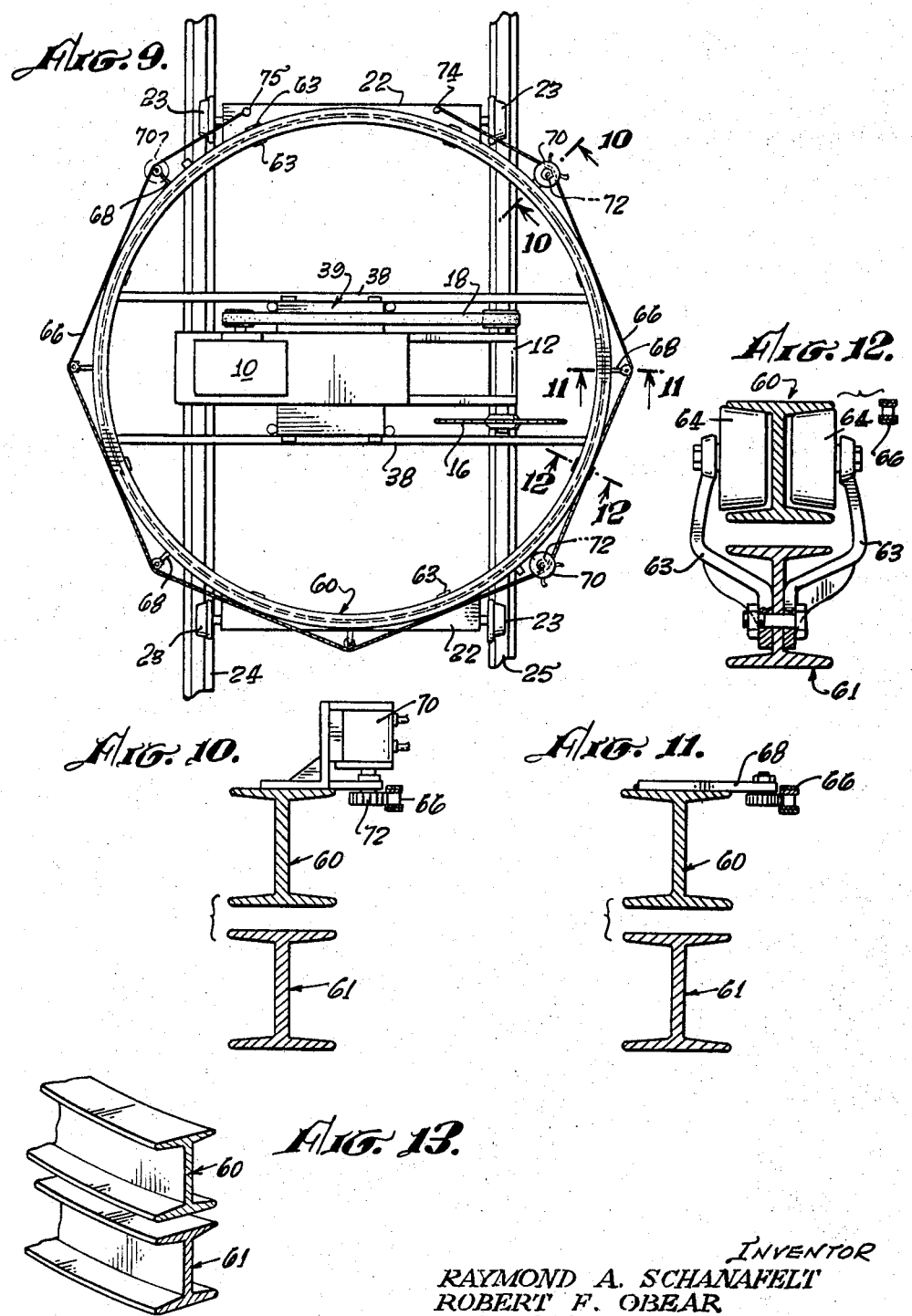

3,421,266
TURNTABLE SAW
Raymond A. Schanafelt, Monte Bello, Robert F. Obear, Torrance, and Clarence E. Milnikel, Pico-Rivera, Calif., assignors to American Railroad Supply Company, Inglewood, Calif., a corporation of California
Filed Mar. 10, 1965, Ser. No. 438,619
U.S. Cl. 51—178         3 Claims
Int. Cl. B24b 27/06

ABSTRACT OF THE DISCLOSURE

A rail saw assembly is described in the following specification which is intended to be used on a railroad for the replacement of rails. The saw assembly is mounted on a wheeled carriage which is constructed to travel on the railroad, and it includes a transverse carriage and a rotatable superstructure. The construction is such that the saw may be used to saw through one rail, and the superstructure may be rotated so that the other rail may also be cut.

---

This invention relates generally to metal cut-off saws, and relates more specifically to a railroad construction saw for fitting and placement of rails.

Fitting of railroad rails into end-to-end relationship, particularly when replacing a rail or a section of a rail, requires meticulous care in order that a new section is cut to exactly the proper dimension and prepared for the section into which it is to fit. This care is required in order that the rail will be removed from service for a minimum amount of time, and also in order that the joints between the old and new rails will be minimized.

If such cutting is done by a welder's torch, there is both the irregularity of such flame cutting to be considered, and the human error of transferring exact measurements.

Abrasive wheels are widely used for cutting metal and will produce a clean straight face on the cut end of the rail. This procedure, as conventionally carried out, will produce better facing surfaces, but nonetheless requires human skill in perfection of measurement in order that the section to be removed is cut exactly as measured, and the section to be inserted is measured exactly to fit the space into which it is to be placed. A very small error will result in an annoying space between the rails.

It is an object of this invention to provide equipment which will cut a replacement rail in the same cutting act as that of cutting the old rail which is to be replaced.

A further object of this invention is to cut a replacement rail to exact dimension of a rail section removed.

Another object of this invention is to provide a turntable of light weight rigid construction.

A further object of this invention is to provide a cut-off saw mounted in an open center turntable to provide interior working space for a reciprocating saw table.

A still further object of this invention is to provide a new and novel turntable construction of composite I beams, one of which rides the other as a track, and driven by a power means carried by one of the tracks and geared to the other.

And yet another object of this invention is to provide a cut-off saw adapted to operate in a lateral path to cut a rail and a replacement rail positioned beside the rail, and to swing through 180° to perform the same function on the opposite rail and a replacement rail.

For a full understanding of the invention, a detailed description of the preferred embodiment of the turntable saw will now be given in conjuntcion with the accompanying drawings:

FIGURE 1 is a top view, with some superstructure broken away, of the preferred embodiment of the invention as positioned upon a railroad track with a replacement rail placed between the tracks;

FIGURE 2 is an elevational view of the embodiment illustrated in FIGURE 1, with the superstructure removed for convenience of illustration;

FIGURE 3 is a detail section taken along the line 3—3 of FIGURE 1;

FIGURES 4–6 are schematic illustrations of the device of FIGURE 1 in three operating positions;

FIGURE 7 is a side view of a power drive as taken along the line 7—7 of FIGURE 1;

FIGURE 8 is a detail view taken along the line 8—8 of FIGURE 7;

FIGURE 9 is a top plan view, but without the superstructure, of an alternative embodiment employing beam tracks;

FIGURE 10 is a section taken along line 10—10 of FIGURE 9;

FIGURE 11 is a section taken along line 11—11 of FIGURE 9;

FIGURE 12 is a section taken along line 12—12 of FIGURE 9; and

FIGURE 13 is a fragmentary perspective of the two beams used as frame and track.

This invention provides a turntable adaptation of the invention issued to Edward F. Obear, No. 3,046,707, July 31, 1962. The pivotal mount, the engine and the cut-off wheel relationship of the drawings which illustrate this invention are fully illustrated and described in that patent, and may be referred to for any desired detail concerning the actual cut-off saw mechanism.

In FIGURE 1, an engine 10 and a spindle 12 are located on opposite ends of a frame 14. Spindle 12 carries a cut-off saw blade 16 and derives power from the motor by means of a belt 18. Belt 18 also drives an oscillating device 20, better shown in FIGURE 2, which causes the frame 14 to oscillate back and forth and thereby carry the cutter blade 16 in a transverse oscillation movement relative to a rail being cut.

According to this invention, a base 22, in the form of an undercarriage circular rail, is mounted upon wheels 23 to travel along upon rails 24 and 25. The illustrated embodiment of the invention employs a novel construction for producing an open-center turntable track. Two tubular rings 26 and 27 are stacked and united into a rigid base by welding. Thus, a base is provided, and it is provided with means to establish it over a rail bed and to move the base along the rail bed for proper positioning.

A superstructure turntable 29, also composed of two tubular rings 30 and 31 are stacked and united into a rigid superstructure turntable. Thus, a composite circular rail superstructure is fabricated which may be mounted for rotary travel on the base rail.

A plurality of rollers 33, as best shown in FIGURE 3, are provided to give rolling mobility of the superstructure turntable 29 upon the base 22. Each roller 33 is provided with an axle 34 and side flanges 35 and 36. The side flanges are on opposite sides of the roller 33 and extend to a curved end configuration, as shown in FIGURE 3, to embrace the circular rails as guide flange means. Thus, the superstructure is guided and held against separation. By lifting the superstructure, the base and wheels will also be lifted through this coupling device.

Rails 38, carried transversely of the superstructure turntable 29, support a reciprocative carriage 39 for transport of the frame 14 through a limited lateral path. It will be noted that the carriage 39 carries a pivot block 40 upon which frame 14 is mounted for the described pivotal movement. The oscillating motion is obtained by connecting the oscillating device 20 by means of arms 41 and 42 into a mount carried in the pivot. This action will be more fully understood by reference to the Obear Patent No. 3,046,707.

The blade 16 is extendable down to contact a rail to be cut and is provided an unhampered work area by means of the circular nature of both the turntable and the superstructure, and the space between the cross rail. A manually operable handle 43 is provided to enable the operator to draw the blade down against a rail with a desired amount of pressure as it oscillates through the drive mechanism described.

Whereas the former device as shown in the Obear patent was limited to cutting a given rail, and required the entire assembly to be picked up and replaced upon the tracks if a rail on the other side were to be cut, the present invention provides 180° rotation in order to enable the saw to be moved without lifting the entire assembly. Perhaps more important, however, is the provision of the ability to cut not only the rail upon which the saw is transported, but an adjacent rail positioned for cutting in the same cutting movement along with the supporting rail. By this means, with the carriage locked in position, the blade may first cut a supporting rail and then move in the fixed path established and proceed to cut an adjacent replacement rail. Human error is thus eliminated. Lateral movement is provided by the operating carriage 39 on the cross rails 38, and the ability of the blade to act on either side of the road bed is provided by the turntable construction.

Because a structure of such size and proportions as illustrated is quite heavy in comparison to human strength for maneuvering, a simplified turning power device in the form of a motor 45 and cable 46 is provided. The motor 45 has a reel 47, and the cable 46 is looped at least once around the reel. Cable 46 extends circumferentially around the base 22 and is guided on roller tracks 48. It is connected at each end 49 to the carriage structure in order to maintain its relative position with respect to the base. As the motor 45 is actuated, the reel 47 will pull itself along the cable and cause the turntable to move to the desired position. Further, a hydraulic piston and cylinder motor 50 is connected to the side of the superstructure at one end and to the frame 14 at the other for driving the frame 14 to a desired position.

In the FIGURES 9 through 10, an alternative embodiment is employed wherein beams 60 and 61 are employed as frame and track.

As best shown in FIGURE 12, the beam 60 is supported upon the beam track 61 by means of a plurality of arms 63 which support rollers 64.

The double beam construction supported as shown in FIGURE 12 offers a smoothly operating rotatable table and rigidity with ease of manufacture.

Additionally, as an alternative and in some instances preferable construction, a chain 66 is employed together with chain guides 68 and two drive motors 70.

Motors 70 are provided with a sprocket 72 for positive engagement with the chain 66 as best illustrated in FIGURE 10.

There are two motors 70 as seen in FIGURE 9. These motors may be coordinated to drive together for balancing of forces, or may be used alternately, one providing clockwise and the other counterclockwise driving force.

The chain 66 is anchored at points 74 and 75 to the base frame of the structure, and the motors 70 are carried by the rotatable frame. Therefore, the motors pull the frame along the track for rotative drive force.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the invention as hereinafter claimed.

We claim:
1. A new and improved turntable cut-off saw, comprising:
   a circular rail undercarriage, means to support said undercarriage in a horizontal position over the rails of a track bed;
   a circular rail superstructure mounted for rotary travel on said rail undercarriage;
   a cross carriage bridging said superstructure; a rail saw having a motor driven cut-off blade, pivot means mounting said saw on said cross carriage for arcuate sawing through a vertical path to a low position below the rails of the said track bed, said saw having a cross path of travel within the confines of said undercarriage; and
   means to drive said superstructure through at least 180° of travel.

2. A turntable as defined in claim 1, wherein the circular rails are each composed of two circular tubes in a vertical stack;
   a roller having a lateral axle; and
   flanges on opposite sides of said roller embracing said circular rails as guide flange means.

3. A turntable as defined in claim 1, wherein the circular rails are each composed of two circular beams in a vertical stack;
   a roller carriage mounting one in superposed position with respect to the other; and
   a link chain carried by the lower rail, two power chain drives carried by the upper rail and inter-connected with said chain, whereby operation of the chain drives will drive one of the circular rails with respect to the other.

References Cited
UNITED STATES PATENTS

| | | | |
|---|---|---|---|
| 914,004 | 3/1909 | Yale | 104—36 X |
| 1,115,242 | 10/1914 | Pilling | 104—36 |
| 2,364,879 | 12/1944 | Talboys | 51—178 |
| 2,816,401 | 12/1957 | Duff | 51—99 |
| 3,046,707 | 7/1962 | Obear | 51—178 |

FOREIGN PATENTS

| | | |
|---|---|---|
| 295,170 | 8/1928 | Great Britain. |

JAMES L. JONES, JR., *Primary Examiner.*

U.S. Cl. X.R.

51—33